United States Patent
Jha et al.

(10) Patent No.: US 10,715,065 B2
(45) Date of Patent: Jul. 14, 2020

(54) POWER CONVERSION SYSTEMS AND ASSOCIATED METHODS

(71) Applicant: General Electric Company, Schenectady, NY (US)

(72) Inventors: Kapil Jha, Bangalore (IN); Arvind Kumar Tiwari, Bangalore (IN); Saurabh Shukla, Clifton Park, NY (US); Olive Ray, Bangalore (IN)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 15/835,531

(22) Filed: Dec. 8, 2017

(65) Prior Publication Data

US 2018/0175761 A1 Jun. 21, 2018

(30) Foreign Application Priority Data

Dec. 15, 2016 (IN) .............................. 201641042795

(51) Int. Cl.
*H02P 9/00* (2006.01)
*H02M 5/458* (2006.01)
(Continued)

(52) U.S. Cl.
CPC ............ *H02P 9/007* (2013.01); *H02K 7/183* (2013.01); *H02M 5/4585* (2013.01);
(Continued)

(58) Field of Classification Search
CPC ...... H02P 2201/00; H02P 9/007; H02M 7/49; H02M 7/4807; H02M 5/225
(Continued)

(56) References Cited

U.S. PATENT DOCUMENTS 5,757,633 A * 5/1998 Bowles .................. H02M 7/49
                                                                   363/41
6,404,655 B1    6/2002 Welches
(Continued)

FOREIGN PATENT DOCUMENTS

CN       102447404 A    5/2012
CN       105305843 A    2/2016
(Continued)

OTHER PUBLICATIONS

Bhuvaneswari, G., et al., "Three-phase modular single stage full-bridge converter for switched mode power supplies," International Journal of Power Electronics, vol. 5, No. 1, pp. 30-44 (2013).
(Continued)

Primary Examiner — Julio C. Gonzalez
(74) Attorney, Agent, or Firm — Dority & Manning, P.A.

(57) ABSTRACT

A wind power generation system including a doubly fed induction generator (DFIG) of a wind turbine is presented. The DFIG includes a rotor and a stator, a rotor-side conversion unit coupled to the rotor, a direct current (DC) link, and at least one line-side conversion unit coupled to the rotor-side conversion unit via the DC link and coupled to the stator of the DFIG. The at least one line-side conversion unit includes exactly one first converter, high frequency transformers, and second converters, where each of the second converters is coupled to the first converter via a respective high frequency transformer, and inverters, where each of the inverters is coupled to a respective second converter and includes an alternative current (AC) phase terminal.

15 Claims, 4 Drawing Sheets

(51) Int. Cl.
*H02M 7/48* (2007.01)
*H02K 7/18* (2006.01)
*H02M 7/49* (2007.01)
*H02M 5/22* (2006.01)

(52) U.S. Cl.
CPC .......... *H02M 7/4807* (2013.01); *H02M 5/225* (2013.01); *H02M 7/49* (2013.01); *H02M 2007/4815* (2013.01); *H02P 2201/00* (2013.01); *Y02B 70/145* (2013.01); *Y02B 70/1441* (2013.01); *Y02E 10/76* (2013.01)

(58) Field of Classification Search
USPC .......... 322/44, 28; 363/17, 37, 68; 307/105, 307/87; 290/44, 55
See application file for complete search history.

(56) References Cited

U.S. PATENT DOCUMENTS

| | | | |
|---|---|---|---|
| 6,411,528 B1* | 6/2002 | Yasumura | H01F 27/2823 336/170 |
| 7,149,096 B2* | 12/2006 | Batarseh | H02M 3/28 363/16 |
| 8,174,138 B2 | 5/2012 | Dezza et al. | |
| 8,618,456 B2 | 12/2013 | Hinman et al. | |
| 8,644,037 B2* | 2/2014 | Raju | H02M 5/458 363/37 |
| 2001/0030879 A1* | 10/2001 | Greenfeld | H02M 1/38 363/17 |
| 2005/0284673 A1* | 12/2005 | Nakazawa | H02M 7/483 180/65.1 |
| 2006/0233000 A1* | 10/2006 | Akagi | H02M 5/4585 363/37 |
| 2009/0201700 A1* | 8/2009 | Aso | H02M 3/337 363/17 |
| 2013/0070489 A1 | 3/2013 | Zhang | |
| 2013/0234522 A1 | 9/2013 | Tan et al. | |
| 2014/0355311 A1* | 12/2014 | Biebach | H02M 3/33584 363/17 |
| 2015/0145252 A1 | 5/2015 | Lin et al. | |
| 2016/0016479 A1* | 1/2016 | Khaligh | B60L 11/1812 363/17 |
| 2018/0109201 A1* | 4/2018 | Li | H02M 7/487 |
| 2018/0187652 A1* | 7/2018 | Wagoner | H02M 5/4585 |

FOREIGN PATENT DOCUMENTS

| | | |
|---|---|---|
| EP | 2 141 793 A1 | 1/2010 |
| JP | 2016-019298 A | 2/2016 |

OTHER PUBLICATIONS

Hui, S.Y.R., et al., "Modular single-stage, three-phase full-bridge converter with inherent power factor correction and isolated output," IEEE Proceedings—Electric Power Applications, vol. 146, No. 4, pp. 407-414 (Jul. 1999).

Anaya-Lara, O., et al., "DFIG Wind Turbine," in Offshore Wind Energy Generation :Control, Protection, and Integration to Electrical Systems, Chapter 2, pp. 15-17 (Mar. 20, 2014).

Islam, M.R., et al., "A medium frequency transformer with multiple secondary windings for medium voltage converter based wind turbine power generating systems," Journal of Applied Physics, vol. 113, Issue 17, pp. 17A324-1-17A324-3 (May 7, 2013).

She, X., et al., "Review of Solid-State Transformer Technologies and Their Application in Power Distribution Systems," IEEE Journal of Emerging and Selected Topics in Power Electronics, vol. 1, Issue 3, pp. 186-198 (Sep. 2013).

Extended European Search Report and Opinion issued in connection with corresponding EP Application No. 17206520.3 dated May 7, 2018.

\* cited by examiner

POWER CONVERSION SYSTEMS AND ASSOCIATED METHODS

BACKGROUND OF THE INVENTION

One or more embodiments of the present specification relate to power generation systems and more particularly to power conversion unit employed in the power generation systems.

Typically, a power generation system includes a power conversion unit such as a back-to-back converter. The back-to-back converter includes a rotor-side converter and a line-side converter coupled to the rotor-side converter via a direct current (DC) link. A primary function of the back-to-back converter is to regulate active power and reactive power fed into a grid. The power generation system further employs bulky three-winding transformers to provide power to the grid from the back-to-back converter.

Usually, a combination of converters is used as a line-side converter to enhance a value of an output generated by the line-side converter. Further, the rotor-side and line-side converters of the power generation systems include multiple switches. Use of the multiple switches in the power conversion unit results in increased cost and electrical losses. Further, use of the multiple switches is associated with increased control complexity associated with firing of these multiple switches.

In addition, failure of a converter of the combination of converters in the line-side converter or failure of a switch of the multiple switches employed in the line-side converter may adversely affect a value of a line-side output. Further, as will be appreciated, in instances of such failures, reliability of the power conversion unit employing such line-side converter is compromised.

A modular arrangement of the power conversion unit is desirable to improve reliability of the power conversion unit. In recent times, various modular arrangements of power conversion units have been proposed. However, the existing modular arrangements of the power conversion units typically employ a plurality of DC-DC converter stages. Furthermore, each line-side converter of the modular arrangement of the power conversion unit typically provides only a single-phase output.

BRIEF DESCRIPTION OF THE INVENTION

In accordance with aspects of the present specification, a wind power generation system is presented. The wind power generation system includes a doubly fed induction generator (DFIG) of a wind turbine, where the DFIG comprises a rotor and a stator. Further, the wind power generation system includes a rotor-side conversion unit coupled to the rotor of the DFIG, a direct current (DC) link, and at least one line-side conversion unit coupled to the rotor-side conversion unit via the DC link and coupled to the stator of the DFIG. The at least one line-side conversion unit includes exactly one first converter and high frequency transformers. Further, the at least one line-side conversion unit includes second converters, where each of the second converters is coupled to the first converter via a respective high frequency transformer of the high frequency transformers. Also, the at least one line-side conversion unit includes inverters, where each of the inverters is coupled to a respective second converter of the second converters and includes an alternative current (AC) phase terminal.

In accordance with another aspect of the present specification, a wind power generation system is presented. The wind power generation system includes a generator of a wind turbine, where the generator comprises a rotor and a stator. Further, the wind power generation system includes a rotor-side conversion unit coupled to the rotor of the generator. Also, the wind power generation system includes a DC link. Moreover, the wind power generation system includes a plurality of line-side conversion units coupled to each other and coupled to the rotor-side conversion unit via the DC link and coupled to the stator of the generator. Each of the plurality of line-side conversion units includes exactly one first converter, high frequency transformers, and second converters, where each of the second converters is coupled to the first converter via a respective high frequency transformer of the high frequency transformers. Further, each of the plurality of line-side conversion units includes inverters, where each of the inverters is coupled to a respective second converter of the second converters and includes an AC phase terminal.

Furthermore, the wind power generation system includes a controller unit is configured to control operation of the first converter, the second converters, and the inverters, of the plurality of line-side conversion units.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
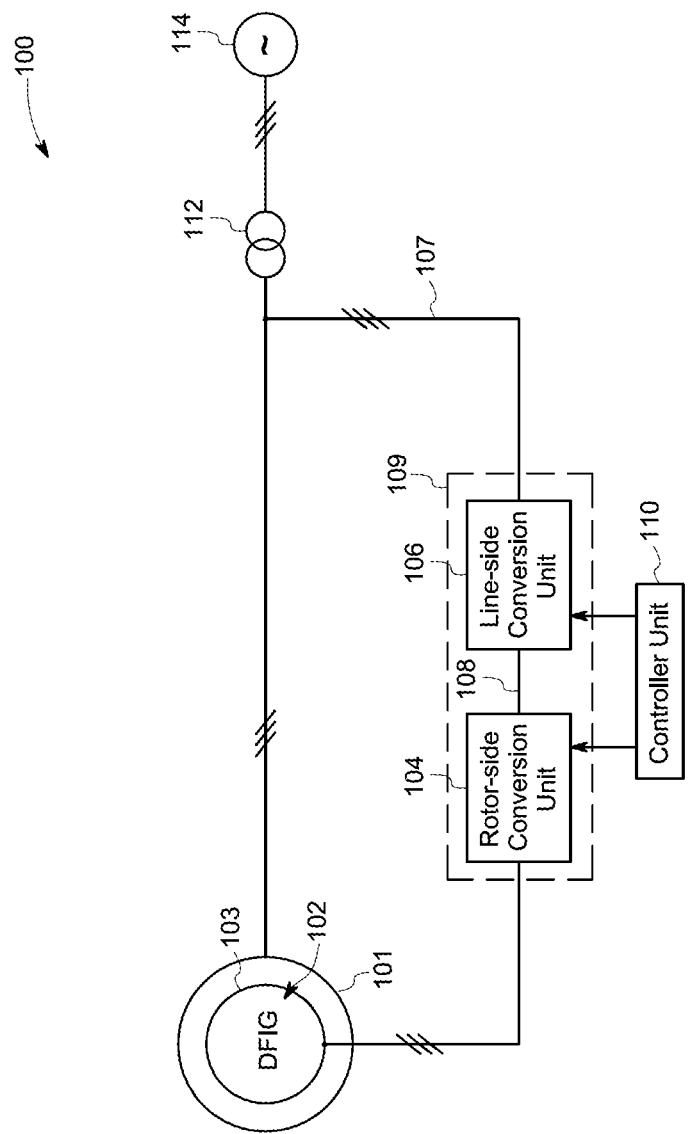
FIG. 1 is a block diagram of a power generation system, according to aspects of the present specification.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of a power generation sub-system for use in a wind power generation system are presented. In certain embodiments, the power generation sub-system includes a rotor-side conversion unit and one or more line-side conversion units. Further, in some embodiments, the one or more line-side conversion units of the power generation sub-system may form a modular arrangement. In particular, the modular arrangement is adaptable to receive, remove, replace, or combinations thereof one or more line-side conversion units of the modular arrangement. Particularly, each line-side conversion unit of the power generation sub-system is in the form of a modular unit of the modular arrangement, where one or more of these modular units may be received by the power generation sub-system, removed from the power generation sub-system, replaced by another modular unit in the power generation sub-system, or combinations thereof. As used, the term "modular arrangement" refers to an arrangement of modular units that allows the modular units to be received, removed, replaced, or combinations thereof, by or from the power generation sub-system. The term "modular unit," as used herein refers to a unit of the modular arrangement that is an integrated block which includes components of the line-side conversion unit, such as, switches and converters. A modular unit is a single line-side conversion unit. A modular unit may be added or removed from a power generation system based on the power requirement of the power generation sub-system. In one embodiment, if a particular modular unit of the power generation sub-system fails due to fault of one or more components of that particular modular unit, the particular modular unit may be conveniently replaced with another modular unit.

In certain embodiments, a plurality of such line-side conversion units is employed in the power generation sub-system. In an embodiment, use of the plurality of line-side conversion units in the power generation sub-system enables increasing the line-side output voltage. Further, each line-side conversion unit of the power generation sub-system provides a plurality of phase terminals. Furthermore, structure of the line-side conversion units of the present specification enables direct connection of the line-side conversion units to a stator winding, such as a stator winding of a doubly fed induction generator (DFIG). Moreover, the number of semiconductor switches and number of converters used in the power generation sub-system is reduced as compared with conventional power generation sub-systems. Therefore, the power generation sub-system of the present specification is less expensive and more compact with a relatively smaller footprint as compared to existing systems. Additionally, a suitable combination of semiconductor switches, such as silicon and silicon carbide switches, in the power generation sub-system may be used to improve the overall system efficiency of the wind power generation system.

FIG. 1 is a block diagram of a wind power generation system 100 of the present specification. The wind power generation system 100 includes a generator, a rotor-side conversion unit 104, and a line-side conversion unit 106. In the illustrated embodiment, the generator is a DFIG 102 of a wind turbine. The DFIG 102 includes a stator 101 and a rotor 103. The rotor-side conversion unit 104 is coupled to the rotor 103 of the DFIG 102. Also, the line-side conversion unit is further coupled to the stator 101 of the DFIG 102. Further, the rotor-side conversion unit 104 is operatively coupled to the line-side conversion unit 106 via a direct current (DC) link 108.

A combination of the rotor-side conversion unit 104 coupled to the line-side conversion unit 106 via the DC link 108 is referred to as a power generation sub-system 109. In one embodiment, the DC link 108 includes at least one capacitor. Each of the rotor-side conversion unit 104 and line-side conversion unit 106 includes an alternating current (AC)-DC converter, a DC-AC converter, a DC-DC converter, or combinations thereof.

Although not illustrated in the embodiment of FIG. 1, in one embodiment, the wind power generation system 100 includes a plurality of line-side conversion units, such as a plurality of line-side conversion units 106, where each of the line-side conversion units 106 is a modular unit, also referred to as "modular line-side conversion units," hereinafter. In an embodiment, the use of modular line-side conversion units 106 improves reliability of the wind power generation system 100. In one example, if a particular line-side conversion unit 106 is detected to be faulty, that particular line-side conversion unit 106 may be easily replaced by another line-side conversion unit. In another example, an additional line-side conversion unit may be added to the wind power generation system 100. A fault in a particular line-side conversion unit may be detected as a result of a decrease in value of an output voltage of that particular line-side conversion unit below a determined threshold value, for example. As will be appreciated, use of the plurality of line-side conversion units enhances value of line-side output voltage. In one example, a line-side conversion unit 106 may be removed from the wind power generation system 100. In this example, the removed line-side conversion unit 106 may or may not be a faulty line-side conversion unit. For example, a line-side conversion unit 106 may be removed without occurrence of a fault to decrease in the required output voltage at line-side 107 of the wind power generation system 100. Further, additional line-side conversion units 106 may be added to increase the output voltage at the line-side 107 of the wind power generation system 100.

In one embodiment, each of the plurality of line-side conversion units 106 employed in the wind power generation system 100 may have the same topology. In another embodiment, at least one of the line-side conversion unit 106 employed in the wind power generation system 100 has a different topology when compared to other line-side conversion units 106 of the wind power generation system 100.

Figure 2:
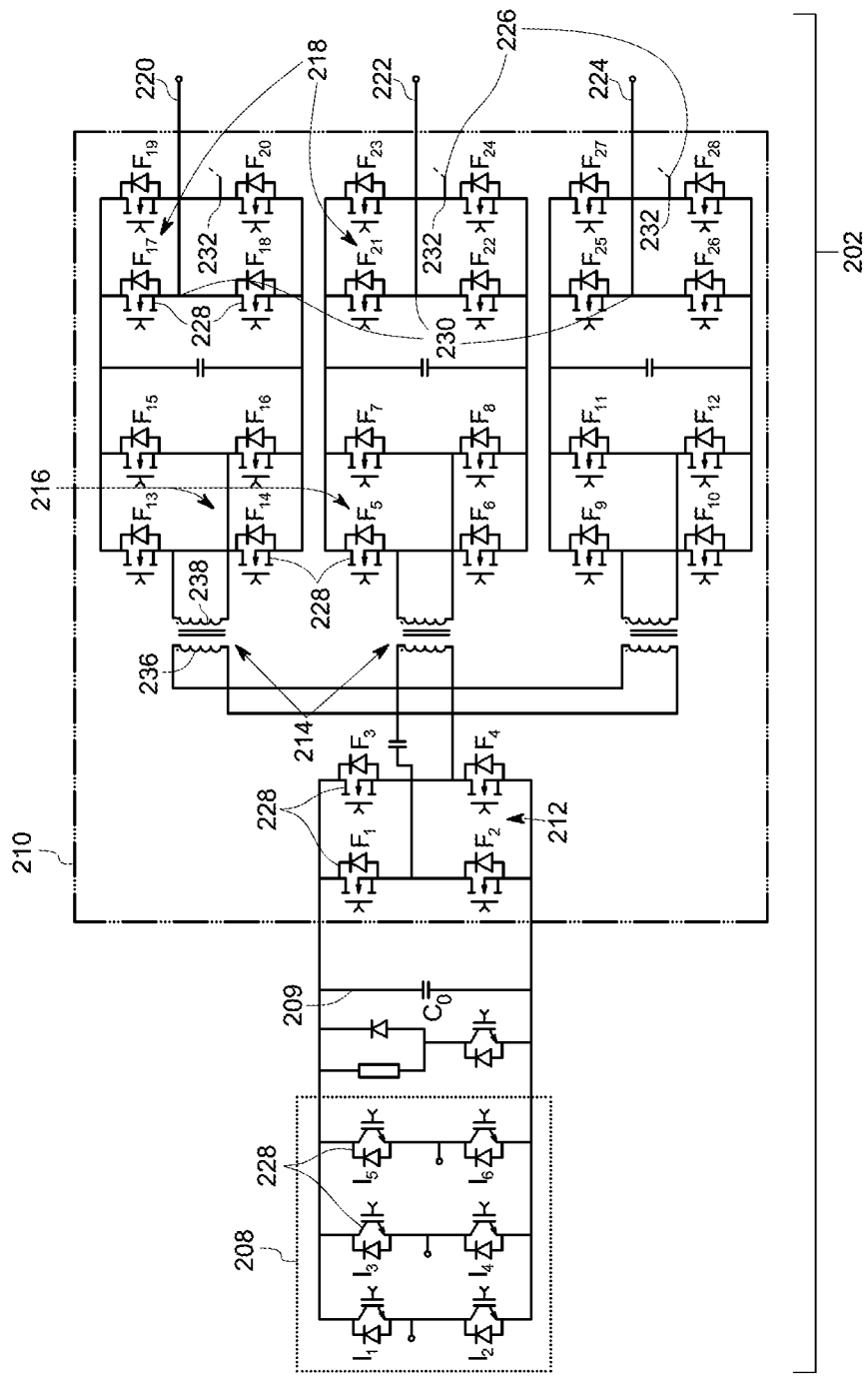
FIG. 2 is a diagrammatical representation of a power generation sub-system for use in the power generation system of FIG. 1, according to aspects of the present specification.
Figure 3:
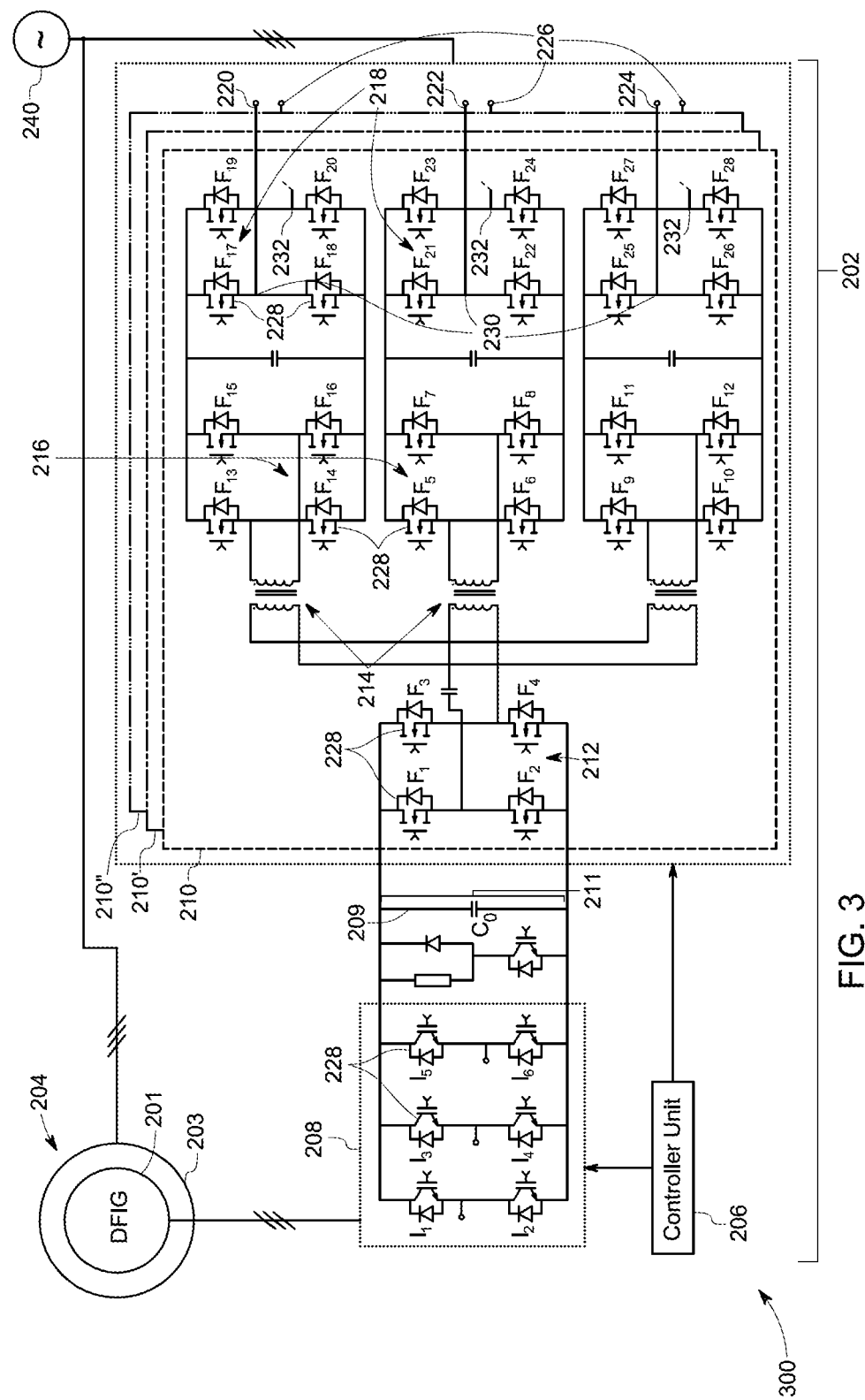
FIG. 3 is a diagrammatical representation of one embodiment of the power generation system of FIG. 1, according to aspects of the present specification.
Figure 4:
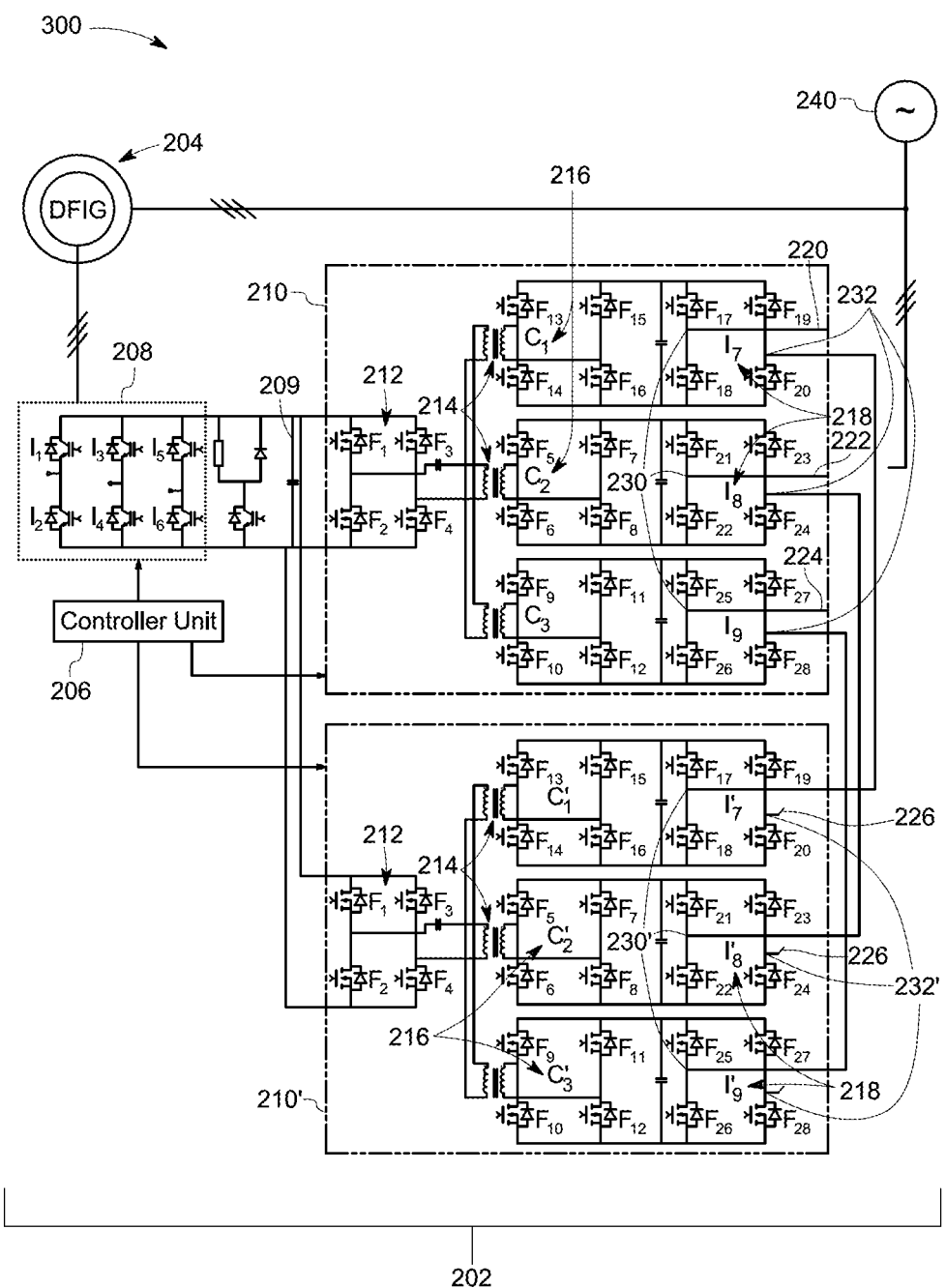
FIG. 4 is a diagrammatical representation of a portion of the power generation system of FIG. 3, according to aspects of the present specification.

Detailed structure of the line-side conversion unit 106 is described with respect to FIGS. 2-4. In one embodiment, each line-side conversion unit 106 includes exactly one first converter (not shown in FIG. 1), second converters (not shown in FIG. 1), and inverters (not shown in FIG. 1). The second converters are operatively coupled to the exactly one first converter via respective high frequency transformers. Further, the inverters are operatively coupled to respective second converters. Also, the second converters of a particular line-side conversion unit 106 are galvanically isolated from one another. The term "galvanically isolated" as used herein is used to refer to isolation between two electrical circuits to prevent flow of current between the two electrical circuits.

In certain embodiments, the inverters of the plurality of line-side conversion units 106 includes a plurality of AC phase terminals. In another embodiment, the inverters of the plurality of line-side conversion units 106 include a plurality of neutral terminals. In some embodiments, a single line-side conversion unit 106 of the plurality of line-side conversion units 106 may include the various terminals including the plurality of AC phase terminals as well as the neutral terminals. In an embodiment where a single line-side conversion unit 106 is employed, inverters of the single line-side conversion unit 106 include the plurality of AC phase terminals and the plurality of neutral terminals.

Furthermore, each of the rotor-side conversion unit 104 and the line-side conversion unit 106 includes a plurality of semiconductor switches. In one specific embodiment, at least some of the semiconductor switches include a controllable semiconductor switch. The controllable semiconductor switch includes at least one of a partially controlled semiconductor switch and a fully controlled semiconductor switch. The controllable semiconductor switch is a switch which is activated or deactivated using a control signal applied to one terminal of the switch. In one embodiment, the control signal is applied automatically during operation of the controllable semiconductor switch. In one embodiment, at least some of the semiconductor switches include an insulated gate bipolar transistor, a metal oxide semiconductor field effect transistor, a field-effect transistor, an injection enhanced gate transistor, an integrated gate commutated thyristor, or the like. In another embodiment, at least some of the semiconductor switches include a gallium nitride switch, a silicon carbide switch, a gallium arsenide switch, a silicon switch, or the like.

The wind power generation system 100 further includes a controller unit 110. Operations of the rotor-side conversion unit 104 and the line-side conversion unit 106 are controlled by the controller unit 110. In particular, switching of the semiconductor switches of the rotor-side conversion unit 104 and the line-side conversion unit 106 is controlled by the controller unit 110.

In certain embodiments, the controller unit 110 includes one or more processors (not shown in FIG. 1). The processors are configured to perform the functions of the controller unit 110. In some embodiments, the controller unit may include a controller, a microcontroller, a microcomputer, a programmable logic controller (PLC), a specification specific integrated circuit, specification-specific processors, digital signal processors (DSPs), Application Specific Integrated Circuits (ASICs), Field Programmable Gate Arrays (FPGAs), integrated circuits, such as integrated circuits employed in a computer, and/or any other programmable circuits.

Furthermore, the line-side conversion unit 106 and stator 101 of the DFIG 102 may be operatively coupled to a load, such as a power consuming device. In the illustrated embodiment, the line-side conversion unit 106 and stator 101 of the DFIG 102 are operatively coupled to a grid 114. The term "grid," as used herein, is used to refer to an interconnected network of generating stations, high-voltage transmission lines, demand centers, and distribution lines for delivering electricity from suppliers to consumers. Under typical operating circumstances, electrical power is provided to the grid 114 by the system 100. When needed under other circumstances, electrical power is received by the system 100 from the grid 114.

In one embodiment, the line-side conversion unit 106 and stator 101 of the DFIG 102 are operatively coupled to the grid 114 via a transformer 112. In the example of FIG. 1, the transformer 112 is a two-winding transformer. The use of a two-winding transformer substantially reduces the size of the power generation system 100. In another embodiment, the line-side conversion unit 106 and stator 101 of the DFIG 102 are directly coupled to the grid 114 without a transformer. In this embodiment, since the use of transformer is avoided, the size of the power generation system 100 is further reduced as compared to a power generation system having the two-winding transformer.

FIG. 2 is a diagrammatical representation of a power generation sub-system, such as the power generation sub-system 109 of FIG. 1. In the illustrated embodiment, a power generation sub-system 202 includes a rotor-side conversion unit 208 coupled to a line-side conversion unit 210 via a DC link 209. The DC link 209 includes a capacitor, $C_0$. Although in the example of FIG. 2, only a single line-side conversion unit 210 is shown to be coupled to the rotor-side conversion unit 208, in an alternative embodiment, a plurality of line-side conversion units, such as the line-side conversion units 210, may be coupled to the rotor-side conversion unit 208.

The rotor-side conversion unit 208 and line-side conversion unit 210 may include an AC-DC converter, a DC-AC converter, a DC-DC converter, or combinations thereof. In the illustrated non-limiting example, the line-side conversion unit 210 includes a first converter 212, a plurality of high frequency transformers 214, a plurality of second converters 216, and a plurality of inverters 218. It may be noted that the power generation sub-system 202 may employ any number of transformers 214, second converters 216, and inverters 218 based on the desired output voltage of the line-side conversion unit. In one embodiment, if the rating of the DFIG, such as the DFIG 102 of FIG. 1, is 6 kV then the output voltage of the line-side conversion unit 210 may be about 6 kV. The first converter 212 is coupled to the plurality of second converters 216 via respective high frequency transformers 214. Since the size of the high frequency transformer is relatively smaller than a size of a low frequency transformer, use of the high frequency transformer 214 enables reduction in a size of the line-side conversion unit 210. Each of the high frequency transformers 214 includes a primary winding 236 and a secondary winding 238. The primary windings 236 of the high frequency transformers 214 are coupled in parallel with one another. The term "high frequency transformer," as used herein, refers to a transformer operating at higher frequencies, typically between a few tens of kilohertz (kHz) to hundreds of megahertz (MHz). The term "low frequency transformer," as used herein, refers to a transformer operating at lower frequencies, typically below a few kilohertz (kHz).

A combination of the first converter 212 and the plurality of second converters 216 forms a DC-DC converter stage. Further, each second converter 216 is coupled to a respective inverter 218. In the embodiment of FIG. 2, the plurality of second converters 216 of a line-side conversion unit 210 are galvanically isolated from one another.

Furthermore, the rotor-side conversion unit 208 includes a plurality of semiconductor switches 228. For ease of representation, the semiconductor switches 228 of the rotor-side conversion unit 208 are represented as $I_1$ through $I_6$. Further, each of the first converter 212, the plurality of second converters 216, and the plurality of inverters 218 of the line-side conversion unit 210 includes a plurality of semiconductor switches 228. The switches 228 of the first converter 212 are represented as $F_1$ through $F_4$. The switches 228 of the plurality of second converters 216 are represented as $F_5$ through $F_{16}$. Moreover, the switches 228 of the plurality of inverters 218 are represented as $F_{17}$ through $F_{28}$.

In one specific embodiment, the semiconductor switches 228 are controllable semiconductor switches. In one embodiment, the semiconductor switches 228 are one or more of insulated gate bipolar transistors, metal oxide semiconductor field effect transistors, field-effect transistors, injection enhanced gate transistors, integrated gate commutated thyristors, and the like. In another embodiment, the semiconductor switches 228 are one or more of gallium nitride switches, silicon carbide switches, gallium arsenide switches, silicon switches, and the like. In a non-limiting example, the first converter 212 and the plurality of second converters 216 include silicon carbide switches and the inverters 218 include silicon switches. Particularly, use of the silicon carbide switches in the first converter 212 and the plurality of second converters 216 and the silicon switches in the inverters 218 facilitates reducing cost and simplifying design of the power generation sub-system 202.

Further, each of the inverters 218 of a particular line-side conversion unit 210 includes two connecting nodes 230, 232. Moreover, in one embodiment, the connecting nodes 230 of the 3 inverters 218 of the line-side conversion unit 210 provide corresponding 3 AC phase terminals 220, 222, 224. The 3 AC phase terminals 220, 222, 224 are an A-phase terminal, a B-phase terminal, and a C-phase terminal, respectively. Moreover, in the example of FIG. 2, the connecting nodes 232 of the 3 inverters 218 of the line-side conversion unit 210 provide 3 neutral terminals 226. In one embodiment, the 3 neutral terminals 226 are coupled to one another. Further, the 3 neutral terminals 226 may be coupled to an earth or a ground terminal (not shown in FIG. 2).

FIG. 3 is a diagrammatical representation of one embodiment of the wind power generation system 100 of FIG. 1, in accordance with aspects of the present specification. In particular, FIG. 3 depicts a wind power generation system 300 having a plurality of line-side conversion units.

The power generation system 300 includes a power generation sub-system 202 and a DFIG 204. The power generation sub-system 202 is coupled to the DFIG 204. The power generation sub-system 202 includes a rotor-side conversion unit 208 coupled to the plurality of line-side conversion units 210, 210', 210" via a DC link 209. The DC link 209 includes a capacitor represented as $C_0$. The DFIG 204 includes a rotor 201 and a stator 203. The rotor 201 includes a rotor winding (not shown in FIG. 3). Further, the stator 203 includes a stator winding (not shown in FIG. 3). The rotor-side conversion unit 208 is operatively coupled to the rotor winding of the rotor 201. Further, the line-side conversion units 210, 210', 210" are operatively coupled to the stator winding of the stator 203. Also, the line-side conversion units 210, 210', 210" and stator 203 of the DFIG 204 are operatively coupled to a grid 240.

Moreover, the 3 line-side conversion units 210, 210', 210" are coupled with each other. In particular, 3 line-side conversion units 210, 210', 210" are cascaded with each other. The term "cascaded," as used herein refers to a series connection. In one example, the 3 line-side conversion units 210, 210', 210" are disposed in a stacked configuration. Although in the example of FIG. 3 only 3 line-side conversion units 210, 210', 210" are represented to be cascaded with each other, however, in alternative embodiments, 4 or more line-side conversion units may be cascaded with each other to step up the output voltage generated by a combination of the line-side conversion units.

First converters of the line-side conversion units 210, 210' and 210" are represented by reference numeral 212, the second converters of the line-side conversion units 210, 210' and 210" are represented by reference numeral 216, and the inverters of the line-side conversion units 210, 210' and 210" are represented by reference numeral 218. As noted hereinabove with respect to FIG. 2, each of the line-side conversion units 210, 210' and 210" includes exactly one first converter 212, a plurality of second converters 216, and a plurality of inverters 218 operatively coupled to one other. The first converters 212 of each of the line-side conversion units 210, 210', and 210" are coupled in parallel to the DC link 209. Particularly, the first converters 212 of the line-side conversion units 210, 210', and 210" are coupled to one another in parallel at a DC link side 211 of the first converter 212. Coupling of one line-side conversion unit to other line-side conversion units is described in greater detail with respect to FIG. 4.

Each of the inverters 218 of each of the line-side conversion units 210, 210' and 210" includes two connecting nodes 230, 232. Further, in one embodiment, the 3 inverters 218 of the line-side conversion unit 210 include 3 AC phase terminals 220, 222, 224, respectively. In particular, the connecting nodes 230 of the 3 inverters 218 of the line-side conversion unit 210 provide 3 AC phase terminals 220, 222, 224, respectively. The 3 AC phase terminals 220, 222, 224 may include an A-phase terminal, a B-phase terminal, and a C-phase terminal, respectively.

Moreover, in one embodiment, the 3 inverters 218 of the line-side conversion unit 210" include 3 neutral terminals 226. In particular, the connecting nodes 232 of the 3 inverters 218 of the line-side conversion unit 210" provide 3 neutral terminals 226. If the system 300 includes 'N' line-side conversion units cascaded with each other, the connecting nodes 232 of the 3 inverters 218 of the $N^{th}$ line-side conversion unit provides the 3 neutral terminals 226. The 3 neutral terminals 226 are coupled to one another. In one embodiment, the neutral terminals 226 are coupled to an earth terminal. The earth terminal is at a zero potential, in one example.

Furthermore, system 300 includes a controller unit 206. The controller unit 206 is configured to control operation of the power generation sub-system 202. In particular, the controller unit 206 is configured to control operation of the rotor-side conversion unit 208 and the line-side conversion units 210, 210', and 210". More particularly, in operation, the controller unit 206 is configured to operate the switches 228 corresponding to the rotor-side conversion unit 208 and the line-side conversion unit 210 between ON and OFF states to generate a desired output. In the line-side conversion unit 210, the controller unit 206 is configured to operate the switches 228 of the first converter 212, the 3 second converters 216, and the 3 inverters 218 between ON and OFF states. The term "deactivated state" or "OFF state" refers to a condition when the switch is electrically non-conducting. The term "activated state" or "ON state" refers to a condition when the switch is electrically conducting.

FIG. 4 is a diagrammatical representation of a portion of the wind power generation system 300 of FIG. 3. In particular, FIG. 4 represents 2 line-side conversion units 210 and 210' coupled to one another.

As noted with respect to FIG. 3, the power generation system 300 includes a power generation sub-system 202 and a DFIG 204. The power generation sub-system 202 is coupled to the DFIG 204. The power generation sub-system 202 includes rotor-side conversion unit 208 and two line-side conversion units 210, 210'. The rotor-side conversion unit 208 is coupled to each of the line-side conversion units 210 and 210' via a DC link 209. The DC link 209 includes a capacitor, $C_0$. Also, the line-side conversion units 210, 210' and stator of the DFIG 204 are operatively coupled to a grid 240.

The line-side conversion unit 210 includes exactly one first converter 212, 3 second converters 216, and 3 inverters 218. In the line-side conversion unit 210, the first converter 212 is coupled to the 3 second converters 216 via respective high frequency transformers 214. For ease of explanation, the 3 second converters 216 are represented as $C_1$, $C_2$, and $C_3$ and the 3 inverters 218 are represented as $I_7$, $I_8$, and $I_9$. In the example of FIG. 4, the 3 second converters 216 are coupled to respective 3 inverters 218. In particular, the second converter $C_1$ is coupled to the inverter $I_7$, the second converter $C_2$ is coupled to the inverter $I_8$, and the second converter $C_3$ is coupled to the inverter $I_9$.

The line-side conversion unit 210' includes exactly one first converter 212, 3 second converters 216, and 3 inverters 218. In the line-side conversion unit 210', the first converter 212 is coupled to the 3 second converters 216 via respective high frequency transformers 214. For ease of explanation, the 3 second converters 216 are represented as $C'_1$, $C'_2$, and $C'_3$ and the 3 inverters 218 are represented as $I'_7$, $I'_8$, and $I'_9$. The 3 second converters 216 are coupled to respective 3 inverters 218. In particular, the second converter $C'_1$ is coupled to the inverter $I'_7$, the second converter $C'_2$ is coupled to the inverter $I'_8$, and the second converter $C'_3$ is coupled to the inverter $I'_9$.

The first converters 212 of the line-side conversion units 210 and 210' are coupled in parallel to the DC link 209. Furthermore, the 3 second converters 216 of the line-side conversion unit 210 are galvanically isolated from one another. Also, the 3 second converters 216 of the line-side conversion unit 210' are galvanically isolated from one another. Additionally, the second converters 216 of the line-side conversion unit 210 are galvanically isolated from the second converters 216 of the line-side conversion unit 210'.

Also, each inverter 218 of the line-side conversion unit 210 includes two connecting nodes 230, 232. Each inverter 218 of the line-side conversion unit 210' includes two connecting nodes 230', 232'. The inverter 218 of one line-side conversion unit 210 is coupled in series with a respective inverter 218 of the other line-side conversion unit 210'. In particular, the inverter $I_7$, of the line-side conversion unit 210 is coupled in series with the inverter $I'_7$ of the line-side conversion unit 210'. More particularly, the connecting node 232 of the inverter $I_7$ of the line-side conversion unit 210 is electrically coupled to the connecting node 230' of the inverter $I'_7$ of the line-side conversion unit 210'. In a similar manner, other inverters $I_8$, $I_9$ of the line-side conversion unit 210 is electrically coupled to inverters $I'_8$, $I'_9$, respectively, of the line-side conversion unit 210'.

Further, in one embodiment, the 3 inverters 218 of the line-side conversion unit 210 include 3 AC phase terminals 220, 222, 224. Moreover, the 3 inverters 218 of the line-side conversion unit 210' include 3 neutral terminals 226.

As noted hereinabove, the line-side conversion units 210 and 210' are modular units. In an embodiment, due to modular arrangement of the line-side conversion units 210 and 210', upon detection of a fault in the line-side conversion units 210 and 210', the faulty line-side conversion unit 210 or 210' may be easily removed or replaced by another line-side conversion unit. The fault in the line-side conversion units 210 or 210' may be a fault in one or more components of the line-side conversion units 210 or 210', such as, a first converter 212, a second converter 216, and an inverter 218 of the particular line-side conversion unit 210 or 210'. In one example, fault in the first converter 212, the second converter 216, or the inverter 218 is caused due to a fault in respective switches of the first converter 212, the second converter 216, or the inverter 218. The fault in the switches may impair proper functioning of the switches and accordingly, an output voltage of the line-side conversion unit 210 or 210' may drop below a determined threshold value. The modular arrangement of the line-side conversion units 210, 210' enhances the reliability of the wind based power generation system 300. Further, the system 300 includes a controller unit 206. The controller unit 206 is configured to control operation of the power generation sub-system 202.

As noted hereinabove, two line-side conversion units 210, 210' are cascaded with each other. Furthermore, for ease of explanation, the switches of the first converter 212 are represented as $F_1$ through $F_4$. The switches of the 3 second converters 216 are represented as $F_5$ through $F_{16}$ Moreover, the switches 228 of the 3 inverters 218 are represented as $F_{17}$ through $F_{28}$.

The controller unit 206 is configured to synchronize switching of the switches of the first converter 212 of the line-side conversion unit 210 with the respective switches of the first converter 212 of the line-side conversion unit 210'. In one embodiment, the switching state of a switch $F_1$ of the line-side conversion unit 210 is synchronized with switching state of a switch $F_1$ of the line-side conversion unit 210' at a given instant of time. More particularly, in this embodiment, if the switch $F_1$ of the line-side conversion unit 210 is in a deactivated state or an OFF state between time $t_1$ to $t_2$, then the switch $F_1$ of the line-side conversion unit 210' is also in the deactivated state between time $t_1$ to $t_2$. Moreover, the switching state of other switches $F_2$ through $F_4$ of the first converter 212 of the line-side conversion unit 210 is synchronized with switching state of respective switches $F_2$ through $F_4$ of the first converter 212 of the line-side conversion unit 210' at any instant of time.

Further, the controller unit 206 is configured to synchronize switching of the switches of the second converters 216 of the line-side conversion unit 210 with the corresponding switches of the respective second converters 216 of the line-side conversion unit 210'. In one embodiment, the switching state of a switch $F_5$ of the second converter 216 of the line-side conversion unit 210 is synchronized with the switching state of the switch $F_5$ of the second converter 216 of the line-side conversion unit 210' at any instant of time. Similarly, the switching states of other switches $F_6$ through $F_{16}$ of the second converters 216 of the line-side conversion unit 210 are synchronized with switching state of corresponding switches $F_6$ through $F_{16}$ of the respective second converters 216 of the line-side conversion unit 210' at any instant of time.

Further, the controller unit 206 is configured to synchronize switching of the switches of the inverters 218 of the line-side conversion unit 210 with the corresponding switches of the respective inverters 218 of the line-side conversion unit 210'. In one embodiment, the switching state of the switch $F_{17}$ of the inverter 218 of the line-side conversion unit 210 is synchronized with switching state of the switch $F_{17}$ of the inverter 218 of the line-side conversion unit 210' at any instant of time. Similarly, the switching state of other switches $F_{18}$ through $F_{28}$ of the inverters 218 of the line-side conversion unit 210 is synchronized with switching state of corresponding switches $F_{18}$ through $F_{28}$ of the respective inverters 218 of the line-side conversion unit 210' at any instant of time. The synchronization of the switching of switches of first converters 212, switches of the second converters 216, and switches of the inverters 218 of the line-side conversion units 210 and 210' reduces harmonic distortion in a combined output voltage generated by the line-side conversion units 210, 210'. Accordingly, footprint of any filter connected to an output terminal of the line-side conversion units 210, 210' is reduced.

Furthermore, the foregoing examples, demonstrations, and process steps such as those that may be performed by the system may be implemented by suitable code on a processor-based system, such as a general-purpose or special-purpose computer. It should also be noted that different implementations of the present technique may perform some or all the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), memory or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory.

Various embodiments of a line-side conversion unit of a power generation sub-system used in a wind power generation system in the form of a modular unit is presented. Since the line-side conversion unit is in the form a modular unit, the line-side conversion unit is easily replaced on occurrence of a fault. Therefore, the power generation sub-system using this line-side conversion unit is more reliable when compared to a power generation sub-system utilizing non-modular line-side conversion units. Further, by cascading plurality line-side conversion units the line-side output voltage is stepped up. Further, the use of the line-side conversion unit enables direct connection of the line-side conversion unit to a stator winding of a DFIG. Further, use of the line-side conversion unit eliminates the need to use bulky transformer to couple the power generation sub-system to the grid. Also, a suitable combination of silicon and silicon carbide switches in the line-side conversion unit improves the overall system efficiency and optimizes cost of the line-side conversion unit. Moreover, in accordance with aspects of the present specification, the line-side conversion unit utilizes reduced number of power electronic switches and converters. Thus, the power generation sub-system employing the line-side conversion unit is economical, profitable, and compact. Similar line-side conversion units may be employed in high voltage power conversion specifications.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wind power generation system comprising:
a doubly fed induction generator (DFIG) of a wind turbine, wherein the DFIG comprises a rotor and a stator;
a rotor-side conversion unit coupled to the rotor of the DFIG;
a direct current (DC) link; and
at least one line-side conversion unit coupled to the rotor-side conversion unit via the D link and coupled to the stator of the DFIG, wherein the at least one line-side conversion unit comprises:
exactly one first converter;
high frequency transformers;
second converters, wherein each of the second converters is coupled to the first converter via a respective high frequency transformer of the high frequency transformers;
inverters, wherein each of the inverters is coupled to a respective second converter of the second converters and comprises an alternative current (AC) phase terminal, each of the first converter, second converters, and the inverters comprising semiconductor switches; and
a controller unit configured to synchronize switching of the semiconductor switches of at least one of the first converter, second converters, or the inverters of the at least one line-side conversion unit with respective semiconductor switches of a first converter, second converters, or inverters of another line-side conversion unit.

2. The wind power generation system of claim 1, wherein the first converter, the second converters, and the inverters comprise semiconductor switches.

3. The wind power generation system of claim 2, wherein the first converter and the second converters comprise silicon carbide switches and the inverters comprise silicon switches.

4. The wind power generation system of claim 1, wherein a combination of the first converter and the second converters forms a DC-DC converter stage.

5. The wind power generation system of claim 1, wherein the second converters of the at least one line-side conversion unit are galvanically isolated from one another.

6. The wind power generation system of claim 1, wherein at least one of the inverters comprise a neutral terminal.

7. A wind power generation system comprising:
a generator of a wind turbine, wherein the generator comprises a rotor and a stator;
a rotor-side conversion unit coupled to the rotor of the generator;
a DC link; and
a plurality of line-side conversion units coupled to each other and coupled to the rotor-side conversion unit via the DC link and coupled to the stator of the generator, wherein each of the plurality of line-side conversion units comprises:
exactly one first converter;
high frequency transformers;
second converters, wherein each of the second converters is coupled to the first converter via a respective high frequency transformer of the high frequency transformers;
inverters, wherein each of the inverters is coupled to a respective second converter of the second converters and comprises an AC phase terminal, wherein each of the first converter, second converters, and the inverters comprises semiconductor switches; and a controller unit is configured to synchronize switching of the semiconductor switches of at least one of the first converter, second converters, or the inverters of one line-side conversion unit with respective semiconductor switches of the first converter, second converters, or the inverters of another line-side conversion unit of the plurality of line-side conversion units.

8. The wind power generation system of claim 7, wherein each of the plurality of line-side conversion units is a modular unit.

9. The wind power generation system of claim 7, wherein each inverter of a line-side conversion unit of the plurality of line-side conversion units comprises a neutral terminal.

10. The wind power generation system of claim 7, wherein first converters of the plurality of line-side conversion units are electrically coupled in parallel to the DC link.

11. The wind power generation system of claim 7, wherein each of the high frequency transformers comprises a primary winding and a secondary winding, wherein the primary winding of each of the high frequency transformers of each of the plurality of line-side conversion units are coupled in parallel with one another.

12. The wind power generation system of claim 7, wherein an inverter of the inverters of a line-side conversion unit of the plurality of line-side conversion units is operatively coupled in series with a respective inverter of the inverters of other line-side conversion unit of the plurality of line-side conversion units.

13. The wind power generation system of claim 7, wherein the generator is a DFIG.

14. The wind power generation system of claim 7, wherein the rotor comprises a rotor winding and the stator comprises a stator winding, wherein the rotor-side conversion unit is coupled to the rotor winding, and wherein the stator winding and inverters are coupled to a grid.

15. The wind power generation system of claim 7, wherein the controller unit is further configured to control operation of the rotor-side conversion unit.

* * * * *